Dec. 29, 1942.  E. C. HORTON ET AL  2,306,946

WINDSHIELD WIPER

Filed April 6, 1940

INVENTORS
ERWIN C. HORTON &
ANTON RAPPL
BY
Bean, Brooks, Buckley & Bean.
ATTORNEYS Patented Dec. 29, 1942

2,306,946

UNITED STATES PATENT OFFICE 2,306,946

WINDSHIELD WIPER

Erwin C. Horton, Hamburg, and Anton Rappl, Buffalo, N. Y., assignors to Trico Products Corporation, Buffalo, N. Y.

Application April 6, 1940, Serial No. 328,270

7 Claims. (Cl. 15—245)

This invention relates to a wiper or wiping blade for the automatic cleaning of windows and windshields of motor vehicles and more particularly to a wiper having a molded squeegee element.

In the molded wiper blades heretofore used on motor vehicles the wiping strip or element had adjacent its wiping edge a relatively thicker or heavier body designed to lend support to the wiping edge and to give adequate reinforcement against the strip collapsing under the spring load of the usual actuating arm. In providing this reinforcement to the wiping strip which is usually molded from rubber or a synthetic compound, the desired flexibility of the wiping edge has been sacrificed to such an extent as to cause an imperfect wiping contact with the windshield glass. Especially is this noticeable where the glass surface might be slightly uneven, or by reason of some foreign matter adhering to the glass on which the wiping edge would raise in passing, or where the wiping edge is not true throughout its length. In these instances a streaky condition will result across the field of vision.

The primary object of the present invention is to provide a wiper possessing the advantages of a molded form of wiping strip and at the same time incorporate the greater and much desired flexibility possessed in the multi-ply type of wiper whose wiping efficiency has been proven.

In the accompanying drawing

Figure 2:
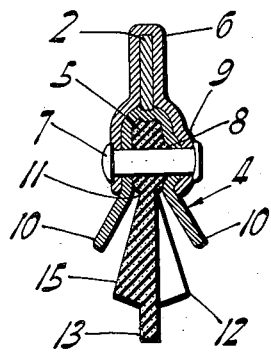
Fig. 2 is an enlarged transverse section through the arm mounted wiper.
Figure 1:
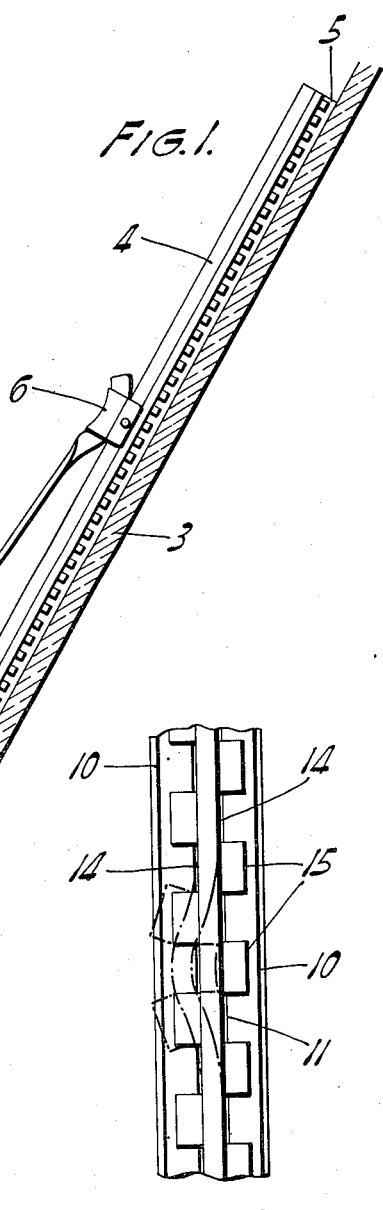
Fig. 1 illustrates in side elevation a wiper improved in accordance with the present invention and associated with a vehicle windshield, the latter being shown in fragmentary section.

Referring more particularly to the drawing the numeral 1 designates the wiper actuating shaft of a windshield cleaner and 2 an actuating arm, the outer end of which is connected to the wiper for actuating the same over the windshield glass 3. The wiper comprises a channeled holder 4 embracing one longitudinal margin of the wiper strip or body 5, an attaching clip 6 being suitably secured over the back of the holder, as by a rivet 7, to receive the outer end of the arm 2 for convenient mounting of the wiping blade.

The wiping strip or body 5 is molded from rubber or other resilient composition and may be formed along one side face with a bead 8 to conformably engage in a recess or groove 9 in the side wall of the holder channel so as to interlockingly anchor the wiping element in a firm and secure manner. This single anchoring bead enables the flat wall of the channel engaging the opposite side face and firmly pressing the bead into its groove. The side walls of the channel may be flared outwardly as shown at 10 to permit a hinging movement of the flexible wiping body for which purpose such body is reduced in thickness to provide a line of hinge, as indicated at 11. From adjacent this hinge line the opposite side faces of the wiping strip are flared outwardly to form reinforcing shoulders 12 beyond which projects a relatively thin wiping edge 13. These lateral shoulders gradually increase in thickness from a point well within the channel and engage with the walls thereof to determine the extent of hinging movement.

In order to give the desired flexibility to this wiping edge while still retaining the reinforcement provided by the lateral shoulders 12 the latter are weakened or broken at intervals by grooves or recesses 14, producing in effect a longitudinal series of lateral positioned serrations or teeth 15 which will permit the flexible wiping edge 13 to readily yield and flex as it passes over any uneven surface. Secondarily these protuberances or teeth will function to scarify or break up any hardened foreign matter in the path of the wiper which may be adhering to the glass.

Figure 3:
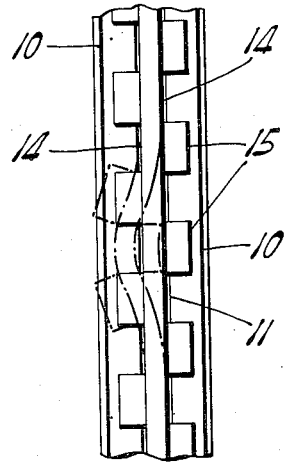
Fig. 3 is a plan view of the wiping edge of the wiper.

The reinforcing projections 15 on one side of the strip may be offset or staggered with respect to those in the longitudinal series on the opposite side of the strip. Each projection may have a width substantially equal to that of the recess 14 and sufficient to bridge approximately the recess between the adjacent projections on the opposite side of the strip so that the wiping edge for its entire length will be given substantial support, but in a manner to permit portions of the wiping edge to yield more readily in one direction of movement than in the return direction, as shown by the broken lines in Fig. 3, wherein it will be noted that the trailing projections on the back face of the strip are free to separate or expand as the strip encounters an obstruction. The projections or teeth may be designed for engagement with the glass surface or foreign matter thereon to act in a scarifying capacity for breaking or loosening such matter to facilitate its removal by the following wiping edge 13. When one tooth engages an obstruction the adjacent teeth of that series are free for relative movement to permit unhindered flexing of the wiping edge, those teeth on the advancing side of the wiper moving toward each other, while those on the remote side tend towards separation.

Figure 4:
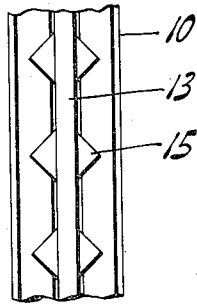
Fig. 4 is a similar view of a slightly modified embodiment of the invention.

The teeth on one side of the strip may be directly opposite those on the opposite side, as shown at 15' in Fig. 4, and may be sharpened to increase their scarifying action.

The wiping edge is given the desired support or reinforcement to hold the wiping edge against buckling or collapsing under the spring pressure of the actuating arm 2. While retaining this reinforcement against collapsing the wiping edge is given the desired transverse flexibility of a single ply element of uniform thickness.

By combining the reinforcement with the added flexibility the wiping edge is caused to function in an efficient manner with the further advantage of having sharpened projections on the advancing side of the wiper to serve in a scarifying capacity.

While the foregoing description has been given in detail it is obvious that the inventive principles herein involved may assume other physical embodiments without departing from the scope and spirit of the invention as set forth in the appended claims.

What is claimed is:

1. A wiper of the squeegee type, comprising a strip-like body of rubbery composition and reinforced along one margin, the opposite margin having a wiping edge and outwardly swelling shoulders spaced therefrom and extending substantially parallel thereto throughout the length of the body, the shoulders having weakened portions at intervals on opposite sides of the body to increase the flexibility of the wiping edge in a transverse manner, said shoulders gradually increasing in thickness from the reinforced margin toward but short of the wiping edge.

2. A wiper of the squeegee type, comprising a strip-like body of rubbery composition having a wiping edge and outwardly swelling shoulders spaced therefrom and extending substantially parallel thereto throughout the length of the body, the shoulders being divided by transverse recesses to form teeth substantially equal in width to the width of the recesses, the teeth on one side being staggered relative to those on the opposite side in a manner to have a tooth on one side directly opposite a groove on the other side of the body.

3. A wiper of the squeegee type, having a channeled holder, a strip-like resilient body anchored along one longitudinal edge portion by the holder, said body having another portion projecting between and beyond the sides of the holder and formed with shoulders of increased thickness, said body also having a relatively thin hinge part between the anchored and the thickened portions, and a relatively thin wiping edge outwardly beyond the thickened portion, the latter being in the form of a longitudinal series of independent teeth on each side of the body defining grooves extending from within the holder toward the wiping edge for the passage of water therethrough to the wiping edge, the teeth being spaced from the sides of the holder within the channel thereof for alternately contacting the sides during the swinging of the thickened portion from the hinge part.

4. A wiper of the squeegee type, having a channeled holder, a strip-like resilient body anchored along one longitudinal edge portion by the holder, said body having another portion projecting between and beyond the sides of the holder with increased thickness and having a relatively thin hinge part between the anchored and the thickened portions, and a relatively thin wiping edge outwardly beyond the thickened portion, a thickened portion having recesses at intervals down to the thickness of the wiping edge so arranged that the projecting body portion has areas extending back toward the hinge part which are substantially equal in thickness to the wiping edge for transverse flexing.

5. A wiper of the squeegee type, having a channeled holder, a strip-like resilient body anchored along one longitudinal edge portion by the holder, said body having another portion projecting between and beyond the sides of the holder with increased thickness and having a relatively thin hinge part between the anchored and the thickened portions, and a relatively thin wiping edge outwardly beyond the thickened portion, the latter being in the form of a longitudinal series of teeth on each side of the body, the teeth extending from within the holder channel and engageable with the sides thereof in determining the extent of hinging movement.

6. A wiper of the squeegee type, comprising a flat strip-like body of rubbery composition reinforced along one margin and having its opposite margin constituting a wiping edge, said body adjacent the wiping edge provided with outwardly swelling shoulders spaced from the wiping edge and extending substantially parallel thereto throughout the length of the body, the shoulders being divided at intervals by transversely extending recesses which reduce the thickness of the body through the shoulders at such intervals to render the body portion flexible laterally of the wiping edge while said shoulders provide support for the wiping edge from the reinforced margin.

7. A wiper comprising a channeled holder having flaring sides, a wiping body of resilient material anchored along one margin to the holder and having its opposite side faces flaring outwardly from within the holder channel into a thickened portion, the flaring of the faces being less than that of the channel sides to space the latter from the faces and permit a free hinging movement of the body therebetween within the channeled holder to an extent as determined by the cushioning engagement of the faces with the sides, said thickened portion having a relatively short and thin edge projecting beyond the holder to flex independently of the thickened portion, such thickened portion being free to fulcrum on and bend over the contacted side of the channeled holder in conjunction with the independent flexing of the relatively short wiping edge.

ERWIN C. HORTON.
ANTON RAPPL.